United States Patent [19]

E'Errico

[11] Patent Number: 4,941,039

[45] Date of Patent: Jul. 10, 1990

[54] COLOR IMAGE REPRODUCTION APPARATUS HAVING A LEAST SQUARES LOOK-UP TABLE AUGMENTED BY SMOOTHING

[75] Inventor: John R. E'Errico, Rochester, N.Y.

[73] Assignee: Eastman Kodak Company, Rochester, N.Y.

[21] Appl. No.: 332,824

[22] Filed: Apr. 4, 1989

[51] Int. Cl.$^5$ .................................................. G03F 3/08
[52] U.S. Cl. ......................................... 358/80; 358/78; 358/75
[58] Field of Search ................. 358/75, 78, 80, 428, 358/447; 364/526; 378/901

[56] References Cited

U.S. PATENT DOCUMENTS

| | | | |
|---|---|---|---|
| 4,346,402 | 8/1982 | Pugsley | 358/80 |
| 4,500,919 | 2/1985 | Schreiber | 358/80 |
| 4,819,193 | 4/1989 | Imao | 358/75 |

Primary Examiner—James J. Groody
Assistant Examiner—Kim Yen Vu
Attorney, Agent, or Firm—Dennis P. Monteith

[57] ABSTRACT

Color image reproduction apparatus, including a video monitor and a computer-based workstation, provides for reading a color image from an input film and for writing a reproduced image on an output film. A plurality of digitally operated look-up tables (LUTs), associated with the workstation, serve for transforming original imaging data to a common color space (CIELUV L* u* v*) and for transforming reproduced imaging data to different use-dependent RGB color spaces, e.g. video monitor, output film, etc. Output color image values stored in each LUT are computed off-line by means of a least squares algorithm applied to an input data set augmented by the second derivative of the function represented by the data set.

4 Claims, 5 Drawing Sheets

COLOR IMAGE REPRODUCTION APPARATUS HAVING A LEAST SQUARES LOOK-UP TABLE AUGMENTED BY SMOOTHING

CROSS-REFERENCE TO A RELATED APPLICATION

Reference is hereby made to U.S. patent application Ser. No. 259,548 filed on Oct. 18, 1988 in the name of J. D'Errico and entitled COLOR IMAGE REPRODUCTION APPARATUS HAVING A DIGITALLY OPERATED LOOK-UP TABLE CONSTRUCTED BY MEANS OF A LEAST SQUARES ALGORITHM.

BACKGROUND OF THE INVENTION

1. Field Of The Invention

The present invention relates to color image signal processing. More particularly, the invention relates to the construction of a look-up table for transforming imaging information between non-linearly related color spaces.

2. Description Of The Related Art

In the following description of relevant background art, reference is made to FIG. 1, of the accompanying drawings, which illustrates generally a problem sometimes associated with the constructing of a look-up table (LUT) for non-linearly related variables.

Color image reproduction systems known in the art permit an operator to edit the color and composition of a given image to form a reproduced image. For example, U.S. Pat. No. 4,500,919 discloses an image reproduction system of one type in which an electronic reader scans a color image, which may be in the form of a transparency or a print, and converts it to an electronic image. A computer workstation and an interactive operator interface, including a video display, permit an operator to edit the image displayed. When the operator has composed a desired image on the video display, the workstation causes an output writer device to make an inked output that is intended to match the reproduced image composed on the video display.

It is also known in the color image reproduction art to computer process color signals in digital form. Digital color correction can provide high accuracy, speed, and flexibility as well as relative immunity to noise. To those ends, U.S. Pat. No 4,346,402 teaches that color correction can be carried out by means of a digitally operated LUT for transforming color coordinate values from one color space to another color space.

A LUT in color image reproduction apparatus can serve to transform a set of color imaging data (multiple independent variables) in one color space to a corresponding set of color imaging data (one or more dependent variables) in a different color space. For example, by mixing three input sources (independent variables)—a red (R), a green (G), and a blue (B)—almost any spectrum output parameter (dependent variable) can be obtained, such as the Munsell value, hue and chroma; the 1976 CIE color spaces CIELAB (L*a*b*) and CIELUV (L*u*v*); etc.

The specifications for Patches of material in a given color space are commonly derived via measurement and calculation using color test strips. Having the specifications for an input color space, for example RGB, and corresponding specifications for an output color space, for example CIELUV (L*u*v*), the transform or functional relationship between the two color spaces can then be defined by means of storing corresponding independent/dependent data values in a LUT.

In the process of gathering test data to define a transformation, however, certain colors may not have been produced on the test strips. In some cases, this may simply be due to missing data; in other cases, however, the film used for the test strips is not capable of supporting the full range of colors to be defined by the LUT.

An input data set 10, illustrated diagrammatically in FIG. 1, used to generate a LUT, must be distributed in a way that the data supply information concerning all LUT nodal values, defined by the intersections of the horizontal lines 12 and the vertical lines 14. If there are "holes", denoted 16, in the data set 10, or if the data set does not "cover" the entire range of the LUT, as denoted by the peripheral region 18, it may not be Possible to construct a LUT for transforming information between non-linearly related variables. When, for example, a LUT is constructed by means of a least squares algorithm, as taught in the aforementioned U.S. patent application Ser. No. 259,548, the least squares technique may be unsolvable (singular). This can happen even if there are more data points in total than there are nodes defining the LUT.

SUMMARY OF THE INVENTION

In view of the foregoing, an object of the invention is to construct, for color image reproduction apparatus, a digitally operated linear least squares LUT from an input data set, whether or not data in the set are distributed to supply information for all nodes defining the LUT.

The LUT to be constructed is to store data representing the transform or functional relationship between two non-linearly related color spaces. By recognizing that such a function, although non-linear, is smooth, the second derivative of the function is, of course, small. This second derivative, however, contains additional information about the function that can supplement information contained in the input data set. This additional information serves to fill any information "voids" in the input data set so that information is provided concerning all LUT nodal values.

Accordingly, the object of the invention is accomplished by applying a least squares algorithm to the combination of the input data as well as data corresponding to the second derivative of the function represented by the LUT. More specifically, the invention is achieved by applying a least squares algorithm to the combination of (1) a first array of data, S, relating a set of dependent variable values in the input data set to a set of dependent function values, $b_i$, to be computed for the LUT, and (2) a second array of data, $p$, relating a set of values of the second derivative of the non-linear function, at selected nodal values of the LUT for the independent variable, to the set $b_i$ of dependent values for the LUT. By applying a least squares algorithm, the set $b_i$ of dependent values for the LUT is computed from:

$$b_1 = (S^T S + \delta^2 p^T p)^{-1} S^T Y$$

where

Y is the set of dependent values in the input data set, $\delta$ is a smoothing parameter that determines the relative weight to be given the two data arrays combined, and $S^T$ represents the transpose of the S array, etc.

By adding second derivative information to information in the input data set, it is possible to construct a least square LUT when the input data set fails to supply information concerning all LUT nodal values. This advantage, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
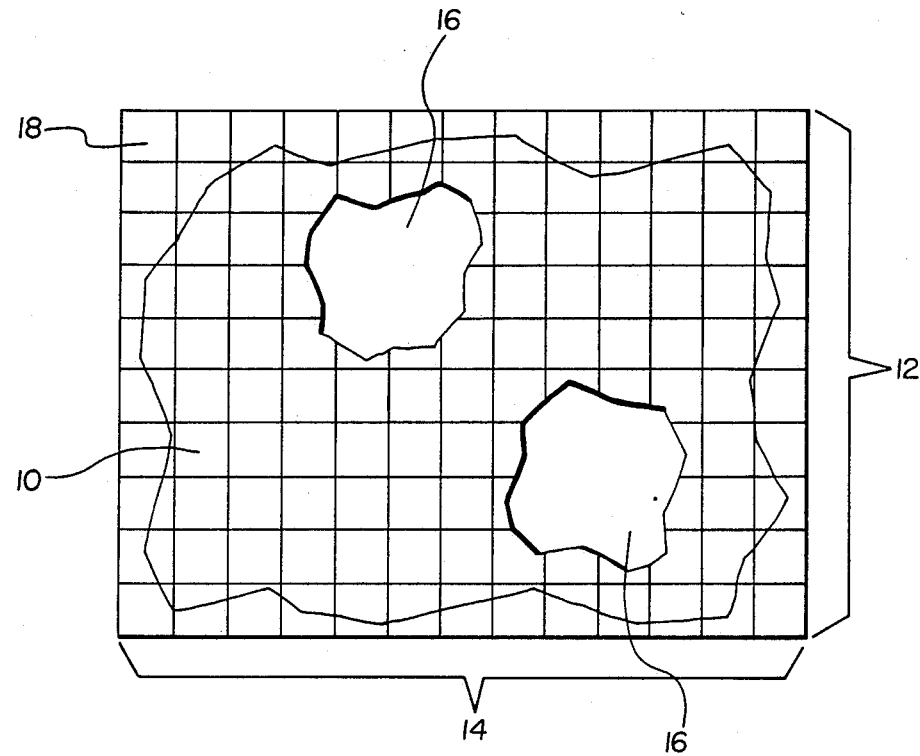
FIG. 1 illustrates a problem sometimes associated with the constructing of a LUT for non-linearly related variables.

An object of the invention is to construct a linear least squares LUT from an input data set, whether or not the data set is distributed in a way that information is supplied for all nodes defining the LUT. More specifically, a linear least squares LUT is constructed whether or not there are "holes" in the data set corresponding to nodes of the LUT or whether or not the data set "covers" the entire range of nodal values defining the LUT.

In a general sense, the object of the invention is achieved by adding information to the input data set by supplying values of the second derivative of the function represented by the LUT. More specifically, the object of the invention is achieved by applying a least squares algorithm to the combination (1) $\Sigma(Y-S\beta)^2 + \delta^2 \Sigma Y''^2$ where Y is an $(n \times 1)$ vector of known observations (values) of a dependent variable of the function to be stored in the LUT, $\beta$ is a $(w \times 1)$ vector of nodal values of the dependent variable of the function to be stored in the LUT, S is an $(n \times w)$ "interpolation" vector relating n observations of the vector Y to w values of the vector $\beta$, $\delta$ serves as a smoothing parameter that determines the relative weight to be given the second term in the above expression (1), and Y" is the second derivative of the dependent variable Y.

Since it will be useful later on in fully describing the invention, consideration will first be given to the way in which a least squares LUT is constructed. To that end, the aforementioned U.S. patent application Ser. No. 259,548, the disclosure of which is incorporated herein by reference, teaches that a one-dimensional least squares LUT can be derived from a model in the form $$Y = S\beta + \epsilon$$

where

Y, S, and $\beta$ are as defined hereinbefore, and $\epsilon$ is an $(n \times 1)$ error vector of the so-called residuals.

The term "cell" means the "region" between and including an adjacent pair of nodes of the LUT. For an independent variable, x, a cell is defined by adjacent nodes $(x_{i-1}, x_i)$, $(x_i, x_{i+1})$, etc. As taught in Ser. No. 259,548, interpolation is a simple matter of first determining within which cell of a LUT a particular value of the independent variable, for example $x_p$, resides, e.g. $x_j \leq x_p \leq x_{j+1}$. The extent to which the value $x_p$ "penetrates" its resident cell, denoted $s_p$, is then computed from:

$$s_p = (x_p - x_j)/(x_{j+1} - x_j)$$

A linear interpolation to find the value, $y_p$, of the dependent variable corresponding to $x_p$, is computed from:

$$y_p = b_j + (b_{j+1} - b_j)s_p$$

or $$y_p = (1-s_p)b_j + s_p b_{j+1}$$

where $b_j$ is the nodal value of the LUT for the dependent variable corresponding to $x_j$.

Accordingly, interpolation within a cell of a one-dimensional LUT is simply a linear combination of nodal values of the LUT defining the boundary for that cell, the node at the right boundary of the cell being weighted by the "depth-of-penetration" $s_p$ and the node at the left boundary being weighted by $(1-s_p)$.

The sum of squares of the residuals, i.e. $\epsilon = Y - S\beta$, can be written as $$\epsilon^T \cdot \epsilon = (Y - S\beta)^T(Y - S\beta)$$
$$= Y^T Y - 2\beta^T S^T Y + \beta^T S^T S \beta$$

where $Y^T$ is the transpose of the Y matrix, etc.

Ser. No. 259,548 further teaches that the least squares estimate of $\beta$ is the value of a vector, b, which when substituted for the vector $\beta$ (or $\beta^T$), minimizes the product of the residuals, e.g., $\epsilon^T \cdot \epsilon$. The vector b is determined by differentiating $\epsilon^T \cdot \epsilon$ with respect to $\beta$, and setting the resultant matrix equation equal to zero.

In mathematical form, $$\left. \frac{\partial \epsilon^T \cdot \epsilon}{\partial \beta} \right|_{b=\beta} = 0 = -2S^T Y + S^T S \beta + \beta^T S^T S$$

Since $S^T S \beta$ and $\beta^T S^T S$ are equivalent, substituting the vector b for $\beta$ leads to the normal equations (2) $b = (S^T S)^{-1} S^T Y$ The elements of b are linear combinations of the n observations of the dependent variable, i.e. $y_1, y_2, \ldots, y_n$, and provide unbiased estimates of the $(w \times 1)$ vector $\beta$.

A problem may arise, however, with the above normal equations when the input data set, i.e. the n observations (or values) of the dependent variable and their corresponding values for the independent variable, has "holes" or fails to "cover" the LUT, as illustrated in FIG. 1. If that is the case, the interpolation matrix S may have one or more columns of all zeroes, and thus the inverse of $S^TS$, i.e. $(S^TS)^{-1}$, may not exist.

To achieve the object of the invention, information in the input data set is augmented based on the assumption that the underlying function, $y(x)$, defined by the input data, is smooth. When a function $y$ is smooth, its second derivative, $y''$, can be constrained to be small at all points.

Consideration will now be given to the second derivative term in the expression (1), i.e. $\delta \Sigma Y''^2$. The Appendix of this application contains a detailed derivation showing that the second derivative of a function $y''$ is approximated by:

$$y'' \simeq \frac{2}{h_{i-1}h_i(h_{i-1}+h_i)}[h_i y_{i-1} - (h_{i-1}+h_i)y_i + h_{i-1}y_{i+1}] \quad (3)$$

where $h_{i-1} = x_i - x_{i-1}$ and, of course, $h_i = x_{i+1} - x_i$.

The above approximation of equation (3) is valid for unequally spaced nodes. For equal spacing, i.e. $h = h_i = h_{i-1}$, a much simpler form is obtained:

$$y'' \simeq \frac{1}{h^2}[y_{i-1} - 2y_i + y_{i+1}] \quad (4)$$

The above approximation for a second derivative is a simple linear combination of w nodal values of the LUT and can be modeled in the form:

(5) $y'' \simeq \rho\beta$ where $\rho$ is a matrix relating the linear combinations of the vector $\beta$ to a vector of values for the second derivative of the function $y$. When $y''$ is computed at only the interior nodes of a one-dimensional LUT, $\rho$ becomes a matrix of size $(w-2, w)$.

The invention requires that a least squares algorithm be applied to the combination $\Sigma(\text{residuals})^2 + \delta^2\Sigma(y'')^2$. This can be accomplished by rewriting the two summations using matrix expressions in terms of $\beta$. In other words, substituting $(Y-S\beta)$ for the residuals and $\rho\beta$ for $y''$, the above combination becomes of the form:

$(Y-S\beta)^T(Y-S\beta) + \delta^2(\rho\beta)^T(\rho\beta)$

Expanding the above:

$Y^TY - Y^TS\beta - \beta^TS^TY + \beta^TS^TS\beta + \delta^2\beta^T\rho^T\rho\beta$ Since $Y^TS\beta = \beta^TS^TY$, the expression becomes:

$Y^TY - 2\beta^TS^TY + \beta^TS^TS\beta + \delta^2\beta^T\rho^T\rho\beta$

To minimize the above sum (least squares), the aforementioned vector b is determined by differentiating with respect to $\beta$, and setting the resultant equation equal to zero.

In mathematical form, $$0 = -2S^TY + S^TS\beta + \beta^TS^TS + \delta^2\rho^T\rho\beta + \delta^2\beta^T\rho^T\rho$$
$$= -2S^TY + 2S^TS\beta + 2\delta^2\rho^T\rho\beta$$

using again $S^TS\beta = \beta^TS^TS$, etc. Substituting the vector b for $\beta$ leads to the normal equations augmented by smoothing:

(6) $b = (S^TS + \delta^2\rho^T\rho)^{-1}S^TY$

By adjoining the two matrices S and $\rho$, two new arrays are defined as follows:

$$W = \left[\frac{S}{\delta\rho}\right] \text{ and}$$

$$Q = \left[\frac{Y}{O}\right] \text{ where } O \text{ is a null matrix of}$$

where 0 is a null matrix of appropriate size. Substituting W and Q, equation (6) reduces to the standard form of equation (2):

(7) $b = (W_TW)^{-1}W^TQ$

The technique of augmenting a least squares LUT by smoothing, in accordance with the invention, is illustrated by way of example for a simple one-dimensional LUT. To that end, a LUT having nodes at $x = \{0.0, 0.2, 0.4, 0.6, 0.8, 1.0\}$ is to be built for the underlying function $y = x^3$. The corresponding values for the dependent variable are to provide an estimate for linearly interpolated values.

For this purpose, data are needed relating the dependent variable y to the independent variable x. When the function is known, data relating the independent and dependent variables can be computed simply and directly from the function, i.e. $y = x^3$. For this hypothetical problem, however, it is assumed the underlying function is not known; moreover, for the purpose of illustrating the invention, an input data set is selected so that it has a "hole" and it does not "cover" the full range of nodal values, e.g. $x = 0.0, 0.2, \ldots, 1.0$, defining the LUT.

Accordingly, assume that the following sixteen (x, y) pairs of data are generated for the function $y = x^3$:

| $x_i$ | $y = x^3$ |
|---|---|
| .21 | .009261 |
| .22 | .010648 |
| .23 | .012167 |
| .25 | .015625 |
| .27 | .019683 |
| .321 | .033076 |
| .357 | .045499 |
| .37 | .050653 |
| .39 | .059319 |
| .8017 | .51527 |
| .823 | .55744 |
| .875 | .66992 |
| .925 | .79145 |
| .937 | .82266 |
| .964 | .89584 |
| .99 | .9703 |

Figure 2:
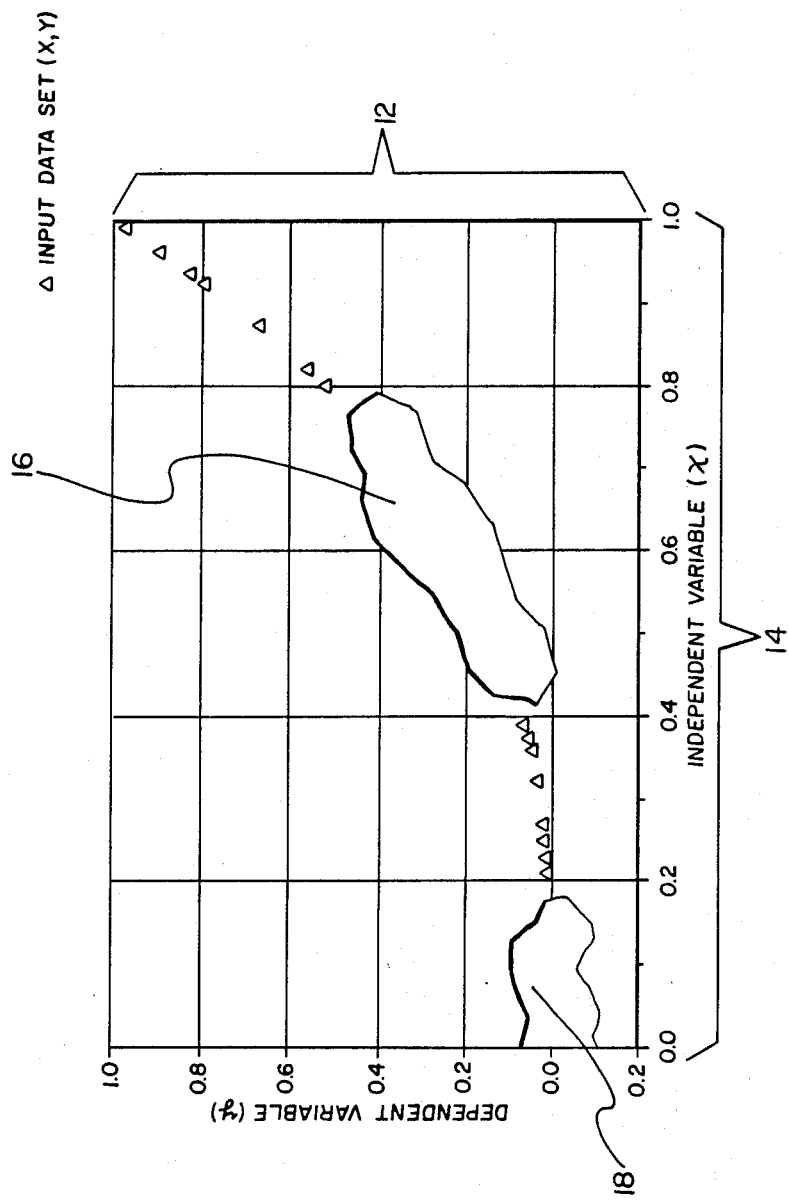
FIG. 2 illustrates the distribution of a particular input data set relative to the range of a LUT to be constructed.

In other words, Y, the (n×1) vector of observations, consists of n=sixteen (16) values. Note, however, as shown in FIG. 2, the data set has a "hole" 16 extending between the nodal values of 0.4 and 0.8, and the data set does not "cover" the LUT below the nodal value of 0.2, as denoted by region 18.

Relating the sixteen corresponding observation of x to the six independent nodes selected for the LUT, e.g. $x = 0, 0.2, 0.4, 0.6, 0.8, 1.0$, the matrix S, i.e. the "interpolation" vector (matrix), is calculated to be of the form:

$$\begin{bmatrix}
0 & .95 & .05 & 0 & 0 & 0 \\
0 & .90 & .10 & 0 & 0 & 0 \\
0 & .85 & .15 & 0 & 0 & 0 \\
0 & .75 & .25 & 0 & 0 & 0 \\
0 & .65 & .35 & 0 & 0 & 0 \\
0 & .395 & .605 & 0 & 0 & 0 \\
0 & .215 & .785 & 0 & 0 & 0 \\
0 & .15 & .85 & 0 & 0 & 0 \\
0 & .05 & .95 & 0 & 0 & 0 \\
0 & 0 & 0 & 0 & .9915 & .0085 \\
0 & 0 & 0 & 0 & .885 & .115 \\
0 & 0 & 0 & 0 & .625 & .375 \\
0 & 0 & 0 & 0 & .375 & .625 \\
0 & 0 & 0 & 0 & .315 & .385 \\
0 & 0 & 0 & 0 & .18 & .82 \\
0 & 0 & 0 & 0 & .05 & .95
\end{bmatrix}$$

Note that the column corresponding to the node for x=0. and the column for the node x=0.6 contain all zeroes. This, of course, results from the lack of data (or information) at and around these nodes. Accordingly, the inverse of S, i.e. $S^{-1}$, may not exist.

The sum of $y''$ is now taken over the interior nodes, i.e. $X_i = 0.2, 0.4, 0.6, 0.8$. For nodes equally spaced by 0.2, e.g. h=0.2, the matrix $\rho$, from equation (5), becomes:

$$\rho = \begin{bmatrix}
25 & -50 & 25 & 0 & 0 & 0 \\
0 & 25 & -50 & 25 & 0 & 0 \\
0 & 0 & 25 & -50 & 25 & 0 \\
0 & 0 & 0 & 25 & -50 & 25
\end{bmatrix}$$

Knowing S, $\rho$, and $\delta$, the matrix W, obtained by adjoining $\rho$ to S, is computed to be:

$$\begin{bmatrix}
0 & .95 & .05 & 0 & 0 & 0 \\
0 & .90 & .10 & 0 & 0 & 0 \\
0 & .85 & .15 & 0 & 0 & 0 \\
0 & .75 & .25 & 0 & 0 & 0 \\
0 & .65 & .35 & 0 & 0 & 0 \\
0 & .395 & .605 & 0 & 0 & 0 \\
0 & .215 & .785 & 0 & 0 & 0 \\
0 & .15 & .85 & 0 & 0 & 0 \\
0 & .05 & .95 & 0 & 0 & 0 \\
0 & 0 & 0 & 0 & .9915 & .0085 \\
0 & 0 & 0 & 0 & .885 & .115 \\
0 & 0 & 0 & 0 & .625 & .375 \\
0 & 0 & 0 & 0 & .375 & .625 \\
0 & 0 & 0 & 0 & .315 & .685 \\
0 & 0 & 0 & 0 & .18 & .82 \\
0 & 0 & 0 & 0 & .05 & .95 \\
25\delta & -50\delta & 25\delta & 0 & 0 & 0 \\
0 & 25\delta & -50\delta & 25\delta & 0 & 0 \\
0 & 0 & 25\delta & -50\delta & 25\delta & 0 \\
0 & 0 & 0 & 25\delta & -50\delta & 25\delta
\end{bmatrix}$$

Note that by smoothing the data, i.e. adding the values of the second derivative of the function at the interior nodes, the matrix W, unlike the matrix S, has at least one non-zero entry in each column, so that the inverse of W exists. In other words, by adding values of the second derivative of the function, to be represented by the look-up table, to data relating the series of dependent values in an input data set to the series of dependent values to be computed for the LUT, the matrix W exists even when the input data set has "holes" or fails to "cover" the range of the LUT.

Knowing W and Q, the vector b, the augmented (smoothed) least squares estimates corresponding to $x_i = 0, 0.2, 0.4, 0.6, 0.8, 1.0$, are computed from equation (7) and are found to be (arbitrarily choosing $\delta = 0.00000002$):

| $x_i$ | $b_i$ | $y(x_i) = x^3$ |
|---|---|---|
| 0.0 | .051116 | 0.0 |
| 0.2 | .0035802 | 0.008 |
| 0.4 | 0.058277 | 0.064 |
| 0.6 | 0.20875 | 0.216 |
| 0.8 | 0.50089 | 0.512 |
| 1.0 | 0.98061 | 1.0 |

The true values of the cubic $x^3$ are included in the third column for comparison with the corresponding values of b. Note that the dependent variable b has values that are different from the corresponding "true" values for the cubic.

Figure 3:
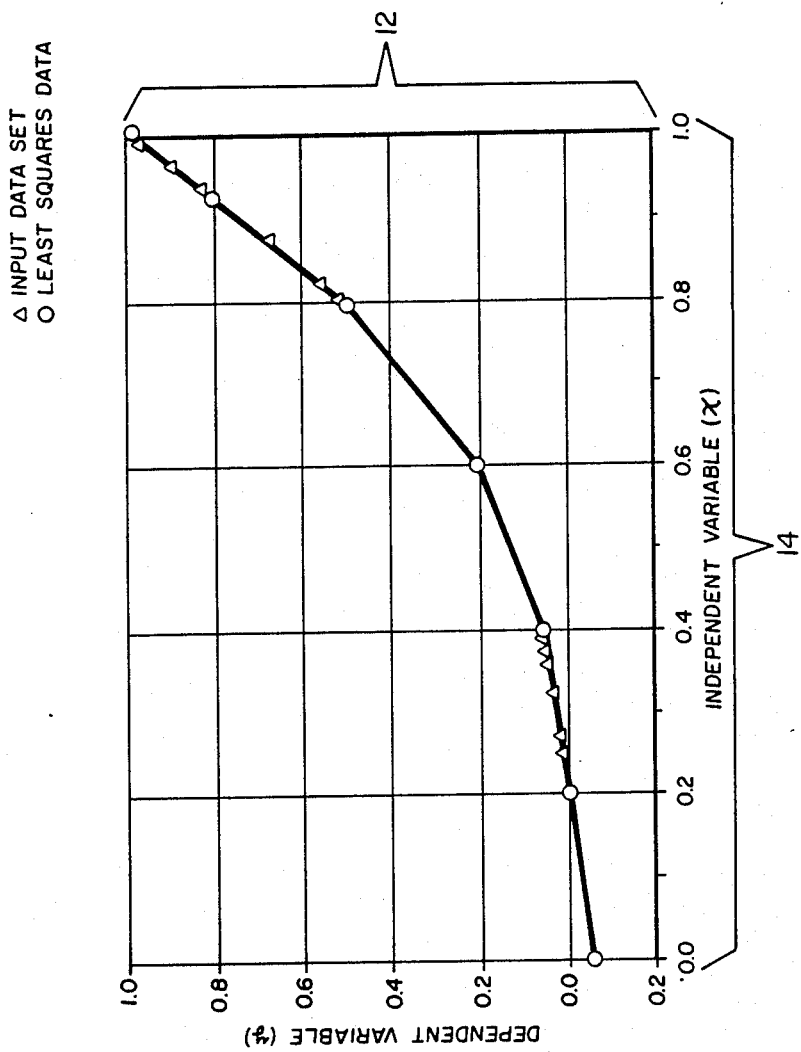
FIG. 3 illustrates a LUT having nodal values constructed by applying a least squares algorithm, in accordance with the invention, to the input data set of FIG. 2.

FIG. 3 illustrates pairs of corresponding values $(x_i, b_i)$ for the LUT together with the input data set. Linear interpolation is represented by the respective slopes of the lines connecting adjacent nodes. Note, in particular, the slope of the lines connecting the nodes $x_i = 0.4, 0.6$ and 0.8 to each other, where input data is non-existent. By using least squares augmented with smoothing, the values $b_i$ minimize any difference in the slopes of the straight lines common to a given node. In other words, the value of the second derivative at these nodes is relatively small since the rate of change of the slope of the "interpolating" line is small at these points.

The above dependent parameters $b_i$, obtained by least squares of the combination of sixteen pairs of data points and the second derivative of the function at the interior nodes, tend to provide an average error of zero for values of the dependent variable when interpolating between neighboring dependent values $b_i$ computed for the look-up table. In actuality, a LUT would have a finer grid and many additional pairs of input data points would generally be used.

The invention serves advantageously for generating a LUT for use with color image reproduction apparatus. For that purpose, a LUT functions to transform a set of color imaging data (multiple independent variables) in one color space to a corresponding set of color imaging data (multiple dependent variables) in a different color space. For example, by mixing three sources (independent variables)—an R, a G and a B—almost any spectrum color (dependent variable) can be obtained.

It will be understood by those skilled in the art that the number of independent variables need not be the same as the number of dependent variables. It will also be understood that LUTS can be used in the reverse direction to transform input signals in one color space to output signals corresponding to R, G, and B.

As referred to previously herein, the specifications for patches of material in a given color space are commonly derived via measurement and calculation using color test strips. Having the specifications for an input color space, for example RGB, and corresponding specifications for an output color space, for example CIE-LUV (L* u* v*), the transform or functional relationship between the two color spaces can then be defined. There is a variety of publications relating to the transforming of imaging data in one color space to imaging data in another color space. See, for example, THE REPRODUCTION OF COLOUR IN PHOTOGRAPHY, PRINTING AND TELEVISION, R. W. G. Hunt, published 1987 by Fountain Press.

When mapping between multivariant functions, the case for transforming between color spaces, individual cells of a LUT may be viewed as a multi-dimensional grid, the number of dimensions being equal to the number of independent variables. For example, with a 3-dimensional grid, each address in the grid has associated with it a triplet of numbers (64 triplets for a 4×4×4 grid) representing a particular combination of independent function values, for example R, G, and B transmittance values. Similarly, each address in the grid has associated with a value for a particular dependent variable—$L^*$, $u^*$, or $v^*$ for the CIELUV color space. Alternatively, each address in the grid may have associated with it multiple values representing a like multiple of dependent values of the LUT, for example, $L^*$, $u^*$ and $v^*$ In the latter case, the transformation of RGB to $L^*$, $u^*$, $v^*$ could be represented by a single LUT.

As taught in Ser. No. 259,248, the use of a multi-dimensional LUT is much the same as described previously for a one-dimensional LUT. For a three-dimensional LUT, linear interpolation is accomplished, as before, by first determining the cell of the LUT in which the value of each independent variable resides, e.g.

$$R_i \leq R_p \leq R_{i+1}$$

$$G_j \leq G_p \leq G_{j+1}$$

$$B_k \leq B_p \leq B_{k+1}$$

For each independent variable, the depth of cell penetration, $S_P$, is computed as before:

$$S_{Rp} = (R_p - R_i)/(R_{i-1} - R_i)$$

$$S_{Gp} = (G_p - G_j)/(G_{j+1} - G_j)$$

$$S_{Bp} = (B_p - B_k)/(B_{k+1} - B_k)$$

With a resident cell of a 3-dimensional LUT—the cell containing each of the three values of a given triplet—may be normalized, and, in so doing, defined at its eight corners, denoted arbitrarily $b_{111}, b_{211}, \ldots, b_{222}$. A linear interpolation, to find for example the dependent variable $L_p^*$ (or $u_p^*$ or $v_p^*$) corresponding to the independent variables $R_p, G_p, B_p$, is computed from:

$$\begin{aligned} F_p(L^*) = & (1 - S_{Rp})(1 - S_{Gp})(1 - S_{Bp})b_{111} + \\ & S_{Rp}(1 - S_{Gp})(1 - S_{Bp})b_{211} + \\ & (1 - S_{Rp})S_{Gp}(1 - S_{Bp})b_{121} + S_{Rp}S_{Gp}(1 - S_{Bp})b_{221} + \\ & (1 - S_{Rp})(1 - S_{Gp})S_{Bp}b_{112} + S_{Rp}(1 - S_{Gp})S_{Bp}b_{212} + \\ & (1 - S_{Rp})S_{Gp}S_{Bp}b_{122} + S_{Rp}S_{Gp}S_{Bp}b_{222} \end{aligned}$$

Note that $S_{Rp}$, $S_{Gp}$, and $S_{Bp}$ all lie, as with a 1-dimensional LUT, between 0 and 1, and thereby $(1-S_{Rp})$, etc. also always fall within the interval 0 to 1. Accordingly, except for the additional terms, an S matrix for a multi-dimensional case is constructed in a manner similar to that of a 1-dimensional LUT.

For the general case of constructing a 3-dimensional LUT for transforming RGB to a different color space, the 2-dimensional matrix S is of a size $$n \times (m_R m_G m_B)$$

where n is the number of corresponding pairs of known observations between RGB and a dependent variable RGB is to be transformed to, and $m_R$, $m_G$, and $m_B$ are the number of addresses of the LUT selected for R, G, and B, respectively.

Figure 4:
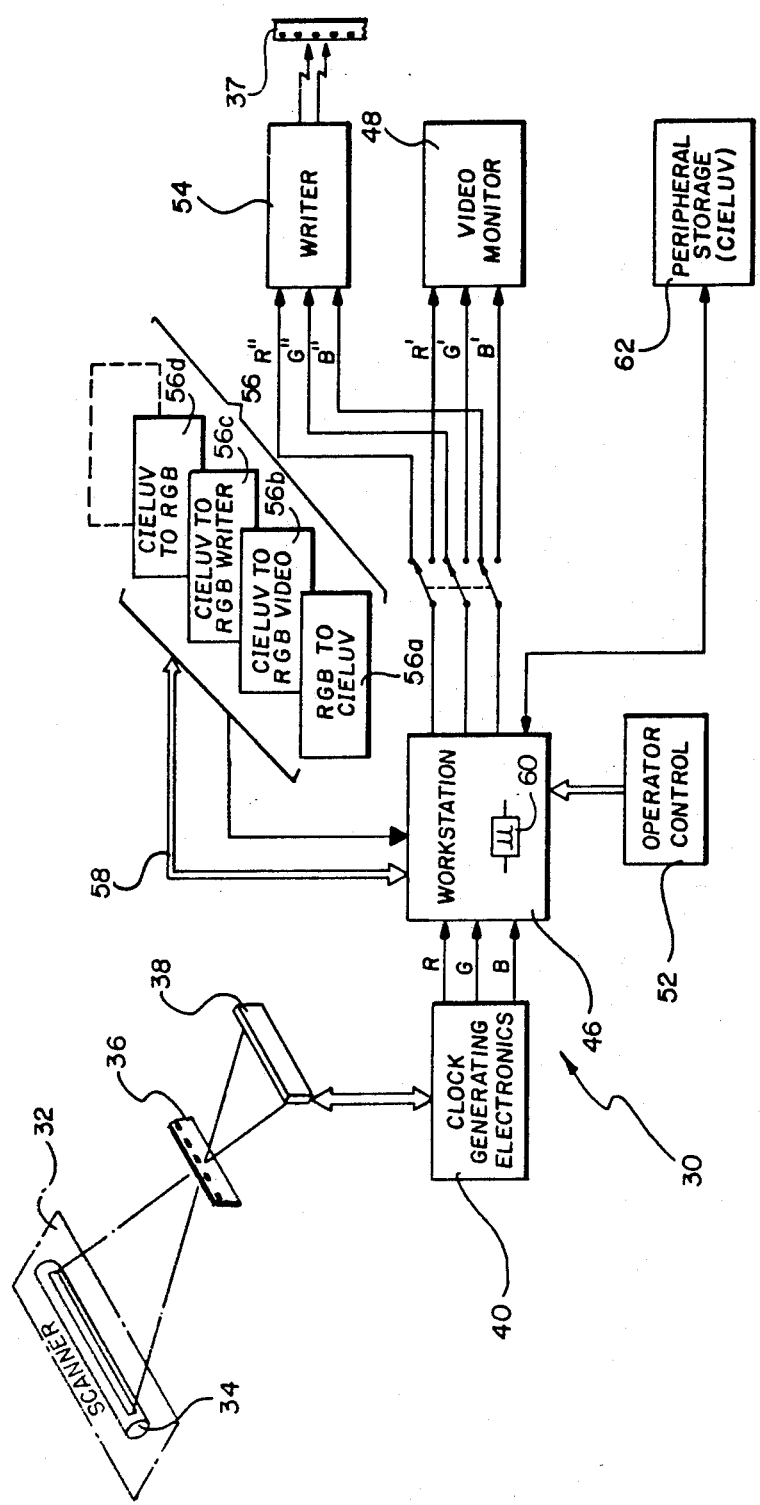
FIG. 4 is a block diagram of color imaging apparatus that utilizes a series of LUTs, constructed in accordance with the invention, for transforming digital color image data between multiple color spaces.

FIG. 4 shows, in block diagram form, color imaging apparatus 30 that permits an operator to edit the color and composition of a photographic image to produce an aesthetically modified image. To that end, the imaging apparatus 30 employs a variety of LUTs, constructed in accordance with the teachings of the present invention, for transforming image data in one color space to data representing the same image in a different color space.

An image scanner 32, having a light source 34 defining preferably a line of diffuse illumination, serves for scanning an image on a photographic film 36. For that purpose, the film 36 is mounted on a movable drum, table or the like (not shown) for stepwise movement in a line scan direction, preferably under the influence of a stepper motor (also not shown).

A charge coupled device (CCD) linear image sensor 38, arranged to receive a line of light modulated in accordance with the film image, includes an overlay comprising three parallel arrays of color filters—red (R), green (G), and blue (B). This "tri-linear" image sensor 38 further includes three corresponding Parallel output registers which are coupled, respectively, to an output of one of the color filter arrays. Thus, the output of one of the registers corresponds to an R signal, a second register to a G signal, and the third register to a B signal.

Clock generating electronics 40 serves to control the CCD sensor 38 and to process its output signals to produce in a known manner a high-resolution signal corresponding to the film image. The clock generating electronics 40 applies R, G, and B signals in digital form to a microprocessor-based workstation 46 for subsequent operations, such as editing the image and to provide a composite video signal for displaying the reproduced image on a video monitor 48.

A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

The microprocessor-based workstation 46 enables an operator to modify (color and/or composition) the digital signal image. To that end, the video monitor 48, which includes a frame store and a digital to analog (D/A) converter, serves to display an image corresponding to R"G"B" signals Provided by the workstation 46. Operator control apparatus 52, preferably including a keyboard and a mouse or tablet, enables an operator to interact with the workstation 46 to provide input information such as film type and film size and to provide image-manipulation commands pertinent to modifying the image displayed. An interactive workstation of this general type may be obtained from Sun Microsystems Inc., Mountain View, Calif.

The workstation 46 preferably stores a representation of the image in a perceptually based color space. The aforementioned CIE 1976 (L*u*v*) color space, commonly called CIELUV, is suitable for that purpose.

The workstation 46 also has available to it color imaging data in R'G'B' space for driving a film writer 54 which preferably is of the type disclosed in U.S. Pat.

No. 4,631,551, assigned to the assignee of the present invention.

For accomplishing its functions, the workstation 46 has associated with it a bank of storage devices 56 that individually serve as a digitally operated LUT for transforming image data in one color space to data representing the same image in a different color space. A first LUT 56a, for example, serves to transform original RGB image data, generated by the image sensor 38, to CIELUV image data; LUTs 56b and 56c function, respectively to transform CIELUV data to RGB video and RGB writer data, in accordance with the sensitivities of the monitor 48 and the writer 54 to their respective drive signals. A LUT 56d serves to transform CIELUV data to RGB space.

The transformations to be made are each a function of the particular photographic film employed (the film type read by the scanner 32 and the film type written onto by the writer 52). Accordingly, additional LUTs, only one of which is shown in phantom, are provided for each film type employed for converting from the appropriate RGB color space to CIELUV or vice versa.

To convert image data into a desired color space, the workstation 46, by means of a LUT select line 58, retrieves "transform" data from the appropriate LUT. One or more processing devices, denoted by a microprocessor 60, perform, under Program control, both logic operations to retrieve data values from the correct addresses of the LUT selected and arithmetic operations for linear interpolation on the values retrieved.

When a desired image has been composed on the video monitor 48, an operator may make a machine-readable record of the image composed. To that end, a peripheral storage device 62, such as a magnetic tape or magnetic disk, functions to record image-bearing signals, preferably in CIELUV space, corresponding to the final image composed.

A least squares LUT, augmented in accordance with the present invention, is constructed "off-line", as part of the manufacturing and assembly of a presently preferred embodiment of color imaging apparatus. To that end, a solid state read-only memory (ROM) or a magnetic disk serves as a suitable storage device for each LUT constructed.

There are two factors to be considered initially in the construction of a LUT of a given capacity. The first concerns the space between neighboring values of a given variable. The number of nodes (or cells) actually used, i.e. LUT capacity, is determined, among other things, by the accuracy requirement of the LUT and the storage space available.

Figure 5:
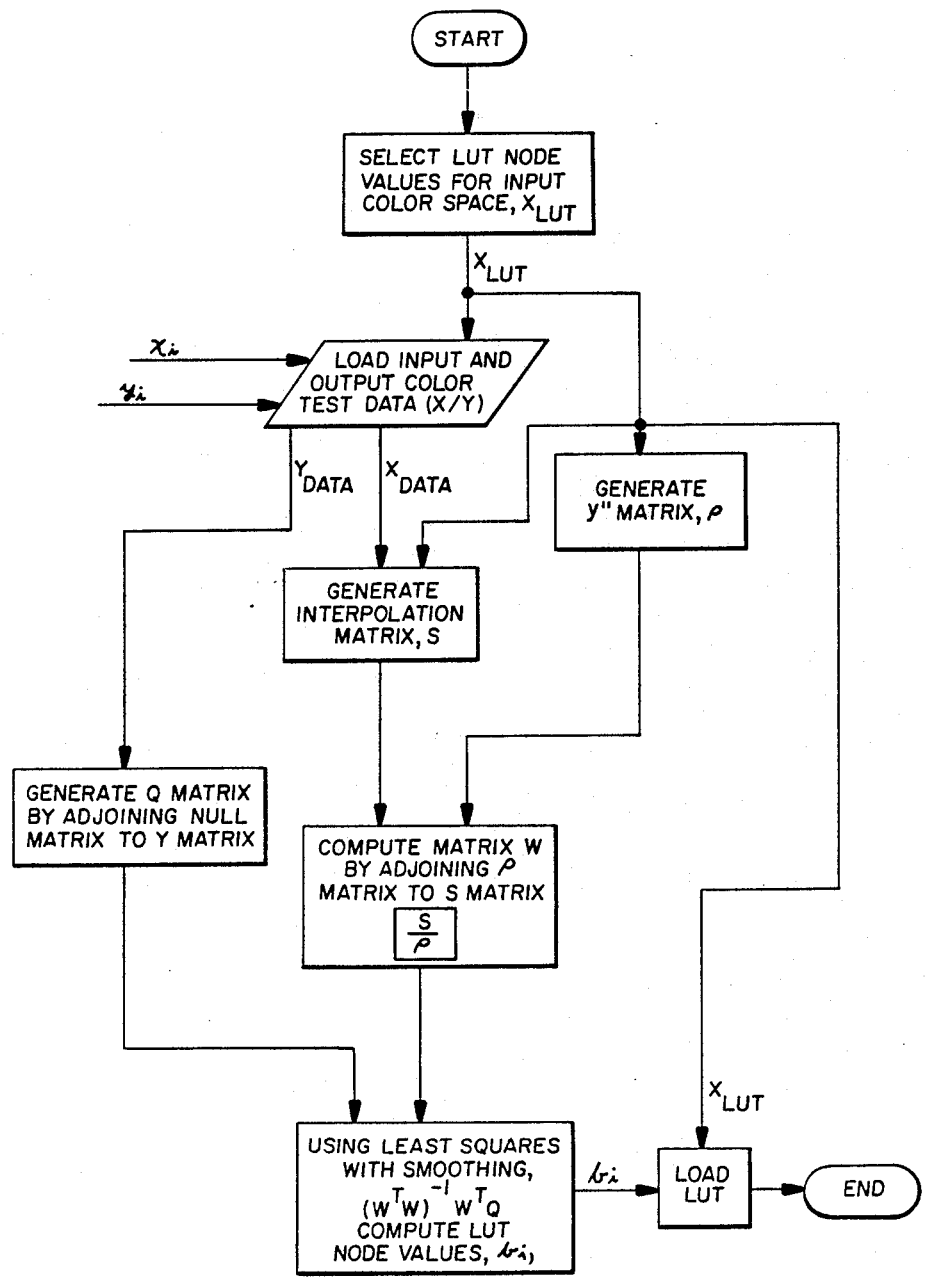
FIG. 5 is a flowchart illustrating the construction of a LUT in accordance with the teachings of the invention.

A second factor in the construction of a LUT is the values to be assigned to each dependent variable based on the values of the independent variables selected. FIG. 5 illustrates generally, in flowchart form, the manner in which a linear least squares algorithm augmented by smoothing is employed in computing the values for the set of dependent variables to be entered into each LUT.

First, the number of nodes and the signal values for the independent variable (x) for such nodes are selected. A particular advantage of my invention is that the values selected for a given independent variable need not be equally spaced. Accordingly, in regions where a dependent variable is changing more rapidly with changes in a given independent variable, the spacing between adjacent nodes can be smaller to reduce localized interpolation errors.

FIG. 5 also shows that the functional relationship between two color spaces is determined by using laboratory test data. For example, a densitometer functions for reading R, G, and B density values from color test strips; spectrophotometric methods, known in the art, serve to provide the data needed to calculate corresponding $L^*$, $u^*$, and $v^*$ values. Generally, the larger the set of off-line data values, the greater the accuracy of the LUT to be constructed.

After the off-line data relating different color spaces are correlated, the aforementioned $\rho$ matrix, relating values of the second derivative of the underlying function at interior nodes selected for the LUT, and the S matrix, relating to interpolated values, are computed; these two matrices are adjoined to compute the W matrix; then, corresponding node values for each dependent variable are computed, as a function of the W matrix and the matrix Q of observations (test data) of the dependent variable, e.g. $(W'W)^{-1}W'Q$.

The invention has been described in detail with reference to the figures; however, it will be appreciated that variations and modifications are possible within the spirit and scope of the invention.

APPENDIX

Using a Taylor series expansion, a smooth function, $f(x)$, can be approximated by:

$$f(x) \simeq f_o + f_o'x + f_o'' \frac{x^2}{2}$$

where
$f_o = f(o)$, and
$f_o'$ is the first derivative of the function $f(x)$ at $x=0$, etc.

Using
$h_i = x_{i+1} - x_i$
$0 = x_i - x_i$
$-h_{i-1} = x_{i-1} - x_i$, and defining
$f(h_i) = f_{i+1}$,
$f(o) = f_i$, and
$f(-h_{i-1}) = f_{i-1}$, then
$f_{i+1} \simeq f_i + f_o'h_i +$ $$f_o'' \frac{h_i^2}{2},$$

$f_i = f_i$, and
$f_{i-1} \simeq f_i - f_o'h_{i-1} +$ $$f_o'' \frac{h_{i-1}^2}{2}.$$

It follows that,
(1) $f_{i+1} - f_i \simeq f_o'h_i +$ $$f_o'' \frac{h_i^2}{2}$$

and
(2) $f_{i-1} - f_i \simeq -f_o'h_{i-1} +$ $$f_o'' \frac{h_{i-1}^2}{2}$$

Multiplying equations (1) and (2) by $h_{i-1}$ and $h_i$, respectively, and adding the resultant products together:

$$h_{i-1}(f_{i+1} - f_i) + h_i(f_{i-1} - f_i) = f_o'' \left( \frac{h_i^2}{2} h_{i-1} + \frac{h_{i-1}^2}{2} h_i \right)$$

$$f_o'' \simeq \frac{2}{h_{i-1}h_i(h_{i-1} + h_i)} [h_i f_{i-1} - (h_{i-1} + h_i)f_i + h_{i-1}f_{i+1}]$$

For equal intervals, $h_{i-1} = h_i = h$, then $$f_o'' \simeq \frac{1}{h^2} [f_{i-1} - 2f_i + f_{i+1}]$$

$$f_o'' \simeq \frac{1}{h^2} [f_{i-1} - 2f_i + f_{i+1}]$$

What is claimed is:

1. In imaging apparatus including an input device adapted to produce a multivariate signal representing an input image, a look-up table characterized by a series of discrete multivariate input signal values that are functionally related in a non-linear manner to a corresponding series of discrete reproduction signal values representative of useable output image information, and electronic computer means coupling said input device and said look-up table, for linearly interpolating between neighboring multivariate signal values in said look-up table in accordance with an actual multivariate signal provided by said input device, to compute a reproduction signal relating to an output image actually to be used, wherein the improvement comprises:

the discrete reproduction signal values, $b_i$, in said look-up table are computed by means of a least squares algorithm applied to the combination of (1) a first array of data, S, relating a series of values, Y, of a dependent variable of an input data set to the series of reproduction signal values to be computed for said look-up table, and (2) a second array of data, $\rho$, relating a series of values of the second derivative of the non-linear function represented by the input data set, evaluated at selected input signal values, $x_i$, of said look-up table, to the series of reproduction signal values for said look-up table.

2. Imaging apparatus as defined in claim 1 wherein the least squares algorithm results in the series of reproduction signal values for said look-up table being computed from:

$b_i = (S^T S + \delta^2 \rho^T \rho)^{-1} S^T Y$ or its equivalent, where $\delta$ is a smoothing parameter that determines the relative weight to be given the array of data $\rho$.

3. In image composition apparatus including a scanner for scanning a photographic film to produce a tristimulous signal representative of colors in the film, a 3-dimensional look-up table characterized by a series of discrete tristimulous signal values and a corresponding series of discrete reproduction signal values which are functionally related in a non-linear manner to the series of tristimulous signal values and which are representative of colorants to be recorded on a particular photosensitive medium, and electronic computer means, coupling said scanner and said look-up table, for interpolating between neighboring tristimulous signal values in said look-up table as a function of an actual tristimulous signal produced by said scanner, to compute a reproduction signal relating colors in the film to colorants actually to be recorded on the photosensitive member, wherein the improvement comprises:

the discrete reproduction signal values, $b_i$, in said look-up table are computed by means of a least squares algorithm applied to the combinant of (1) a first array of data, S, relating a series of values, Y, of a dependent variable of an input data set to the series of reproduction signal values to be computed for said look-up table, and (2) a second array of data, $\rho$, relating a series of values of the second derivative of the non-linear function represented by the input data set, evaluated at selected input signal values, $x_1$, of said look-up table, to the series of reproduction signal values for said look-up table.

4. Image composition apparatus as defined in claim 3 wherein the least squares algorithm results in the series of reproduction signal values for said look-up table being computed from:

$(S^T S + \delta^2 \rho^T \rho)^{-1} S^T Y$ or its equivalent, where $\delta$ is a smoothing parameter that determines the relative weight to be given the array of data $\rho$.

* * * * *

UNITED STATES PATENT AND TRADEMARK OFFICE
CERTIFICATE OF CORRECTION

PATENT NO. : 4,941,039
DATED : July 10, 1990
INVENTOR(S) : John R. D'Errico

It is certified that error appears in the above-identified patent and that said Letters Patent is hereby corrected as shown below:

On the title page, under item [19] and in item [75] Inventor — "E'Errico" should read --D'Errico--.

Col. 6, line 10 — Please delete "where 0 is a null matrix of".

Col. 14, line 30 — "combinant" should be --combination--.

Signed and Sealed this

Twenty-fifth Day of June, 1991

Attest:

HARRY F. MANBECK, JR.

Attesting Officer     Commissioner of Patents and Trademarks